Oct. 25, 1938.                    B. S. GLOUGIE                    2,134,364
                                 CURING APPARATUS
                               Filed May 13, 1936
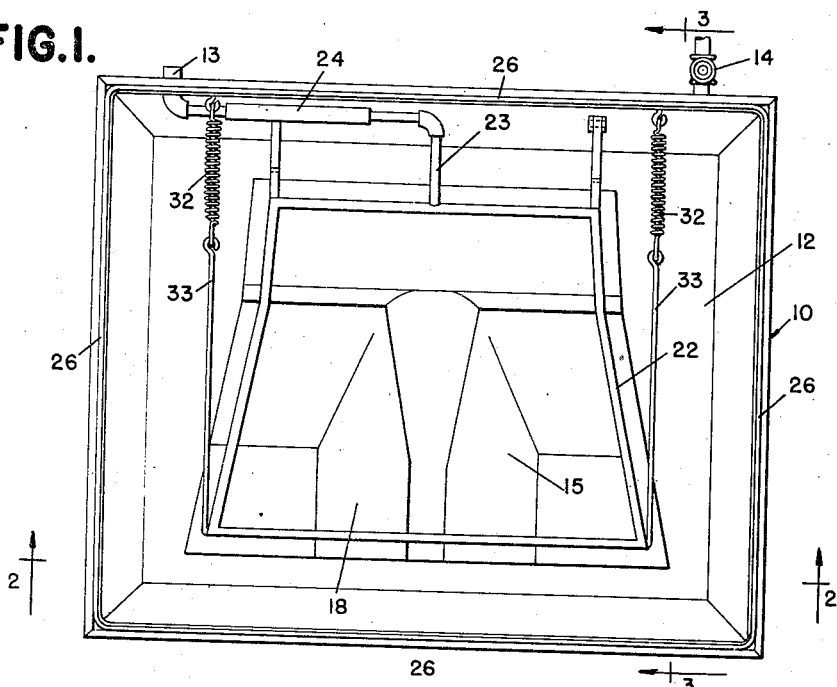
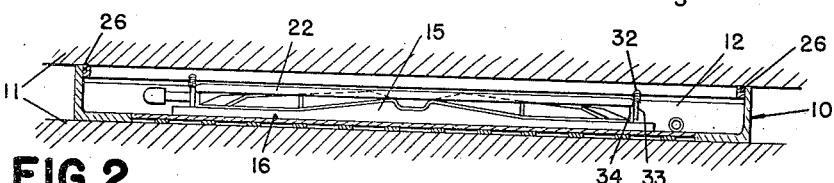
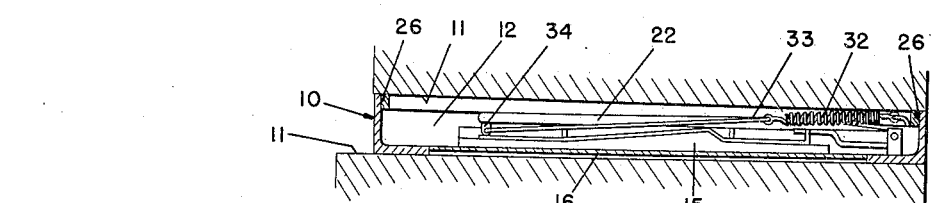
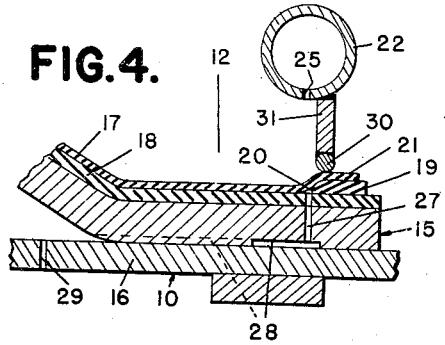
INVENTOR
BERT STANLEY GLOUGIE
BY Whittemore Hulbert
Whittemore & Belknap
ATTORNEYS

Patented Oct. 25, 1938

2,134,364

UNITED STATES PATENT OFFICE

2,134,364

CURING APPARATUS

Bert Stanley Glougie, Pontiac, Mich., assignor to Baldwin Rubber Company, Pontiac, Mich., a corporation of Michigan Application May 18, 1936, Serial No. 80,466

11 Claims. (Cl. 18—19)

This invention relates generally to fluid pressure curing apparatus and refers more particularly to improvements in the sealing means employed in connection with such apparatus.

One of the principal objects of this invention consists in the provision of a relatively simple seal for clamping the marginal edges of a sheet of material to be cured against a form, with such effectiveness as to prevent fluid under pressure from escaping beneath the sheet of material and destroying the intimate contact between the latter and the form required to effectively cure the material to the contour of the form.

Another advantageous feature of the present invention resides in the provision of curing apparatus having a distributing manifold communicating with a source of fluid pressure and constructed to perform the dual function of discharging fluid under pressure into the curing chamber and to effect a fluid tight seal between the marginal edges of the material to be cured and the form for the latter.

A further object of this invention consists in the provision of a fluid distributing manifold in the form of a tubular frame corresponding in outline to the material to be cured and having a series of discharge openings in the under side thereof for directing the fluid under pressure against the material on a line corresponding to the outline of the sheet of material adjacent the marginal edge of the latter to effect a fluid tight seal between the marginal edge portion of the sheet and the adjacent surface of the form.

In addition to the foregoing the present invention contemplates a tubular manifold frame of the character set forth above having means in association therewith for initially holding the material to be cured in contact with the form, and this feature as well as the foregoing will be made more apparent as this description proceeds, especially when considered in connection with the accompanying drawing wherein Figure 1 is a plan view of a typical platen employed in curing apparatus constructed in accordance with this invention;

Figure 2 is a cross sectional view taken substantially on the plane indicated by the line 2—2 of Figure 1;

Figure 3 is a sectional view taken substantially on the plane indicated by the line 3—3 of Figure 1;

Figure 4 is a fragmentary enlarged cross sectional view illustrating the manner in which the material to be cured is sealed;

Figure 5 is a sectional view similar to Figure 4 showing the marginal edge portion of the material to be cured sealed against the form.

For the purpose of illustrating the present invention, I have shown curing apparatus of the type having a platen 10 simulating a drawer in appearance and slidably supported between vertically spaced walls 11. In the operative position of the platen 10 shown in Figure 2 the same cooperates with the top wall 11 to form a fluid pressure chamber 12 having an intake port 13 communicating with a source of fluid under pressure and having a valve controlled exhaust port 14.

Upon reference to Figure 2, it will be noted that a form 15 is secured to the bottom wall 16 of the platen within the latter and the upper surface of this form corresponds in shape to the contour it is desired to cure the sheet of material designated herein by the reference character 17. As shown in Figure 4, the working surface of the form 15 is covered with a sheet of hard rubber, preferably vulcanized to the form and adapted to be engaged by the sheet of material 17.

The finished outline of the sheet of material 17 is defined by a rubber frame 19 vulcanized or otherwise permanently secured to the rubber cover 18 and providing a raised shoulder 20 extending continuously around the predetermined outline of the finished sheet. In actual practice the sheet of material to be cured is sufficiently larger than the finished product to permit the free marginal edge portions 21 thereof to overlap the frame 19, as clearly shown in Figure 4 of the drawing.

In the present instance fluid under pressure from the inlet port 13 is discharged into a tubular frame or manifold 22 located within the platen 10 and having the rear side hingedly connected to the rear wall of the platen. The arrangement is such as to permit the frame to be swung from the operative position thereof shown in Figure 2 to an inoperative position wherein sufficient clearance is available to permit the sheet of material 17 to be readily positioned on the form in the manner shown in Figure 4. The inlet port 13 communicates with the rear side of the manifold 22 through the medium of an intake conduit 23 embodying a flexible tube 24 fashioned to permit unobstructed swinging movement of the manifold without destroying the communication between the latter and the source of fluid supply.

Upon reference to Figure 1 it will be noted that the outline of the manifold 22 corresponds to the outline of the sheet of material 17, and the lower wall of the manifold is formed with a series of restricted ports 25 therethrough spaced from each other in the direction of length of the manifold. These ports are shown in Figure 4 and are arranged on a continuous line projecting inwardly from the continuous shoulder 20 formed by the frame 19, so that as the fluid under pressure is discharged from the manifold the same impinges on the material 17 adjacent the continuous shoulder 20. The velocity of the fluid discharged from the restricted openings 25 is sufficient to force the material 17 from the position thereof shown in Figure 4 to the position illustrated in Figure 5, wherein a tight seal is effected between the marginal edge portions of the material 17 and the adjacent surface 18 of the form. It will of course be understood that fluid under pressure is admitted to the manifold 22 when the platen 10 is in its operative position shown in Figure 2 wherein the chamber 12 is sealed from the atmosphere by the action of the continuous gasket or seal 26 on the upper wall 11 of the apparatus, and accordingly the manifold not only functions to effect the seal previously referred to, but also serves to build up sufficient pressure in the chamber 12 to force the sheet of material 17 into intimate contacting relation with the contoured surface of the form. In the present instance the fluid under pressure is preheated to a sufficient degree to actually cure the material 17 to the contour of the form.

In order to insure an effective seal between the marginal edge portions of the material 17 and the form 15, provision is made to permit any air trapped beneath the sheet of material 17 to escape or flow out of the platen 10. To accomplish this result the form 15 is provided with a series of air vents 27 having the upper ends communicating with the interior of the chamber 12 immediately adjacent the shoulders 20 and having the lower ends communicating with the atmosphere through the medium of the passages 28 and 29. This construction removes any possibility of air pockets being formed beneath the material 17 and insures a fluid tight seal under the action of the fluid pressure discharged from the restricted ports 25 in the manifold 22.

Referring again to Figure 4 of the drawing, it will be noted that the manifold 22 is positioned above the form 15 by means of a frame 30 engageable with the free marginal edge portions 21 of the material 17 and permanently secured to the under side of the manifold by means of the suspension members 31. In other words, the frame 30 engages the sheet of material 17 outwardly beyond the shoulder 20 and functions to not only locate the manifold in its operative position, but also to initially clamp the sheet of material 17 in position on the form 15.

The frame 30 is yieldably urged into engagement with the free marginal edge portion 21 of the material 17 by means of the springs 32 located on opposite sides of the manifold 22. As shown in Figure 3 the rear ends of the springs 32 are fixed to the rear wall of the platen 10 and the forward ends of these springs are connected to the rear ends of suitable rods 33 having their forward ends pivotally secured to lugs 34 depending from the manifold 22. The points of attachment of the forward ends of the rods 33 are spaced below a horizontal plane including the points of attachment of the rear ends of the springs with the platen, so that the latter function to not only yieldably hold the manifold in its operative position with respect to the form 15, but also operate as counterbalancing springs to assist upward swinging movement of the manifold 22.

Thus from the foregoing it will be apparent that I have provided a relatively simple, highly effective seal for use in direct pressure curing apparatus to positively prevent the escape of fluid under pressure between the material to be cured and the associated form. It will also be noted that my improved seal is secured immediately upon introducing the fluid under pressure into the curing chamber and actually constitutes the means for delivering the fluid pressure to the curing chamber.

What I claim as my invention is:

1. In apparatus of the class described, a fluid pressure chamber, a form in said chamber adapted to support a sheet of material, a manifold in the chamber extending around the marginal edge of the sheet and spaced above said marginal edge, a source of fluid under pressure communicating with the manifold and the latter having provision for discharging fluid under pressure at a relatively high velocity on the sheet of material adjacent the marginal edges of the latter to urge said marginal edges against the adjacent surface of the form.

2. In apparatus of the class described, a fluid pressure chamber, a form in said chamber adapted to support a sheet of material, means for discharging fluid pressure into the chamber including a manifold having restricted outlet openings arranged to discharge fluid under pressure on the sheet of material adjacent the marginal edge of the latter to urge the marginal edge of the sheet against the adjacent surface of the form.

3. In apparatus of the class described, a fluid pressure chamber, a form in said chamber adapted to support a sheet of material, a tubular frame corresponding in outline to the sheet of material and supported in the chamber above said material, said tubular frame communicating with a source of fluid under pressure and having provision for discharging the fluid under pressure at a relatively high velocity on the sheet of material adjacent to and around the marginal edge of the latter.

4. In apparatus of the class described, a fluid pressure chamber, a form in said chamber having an upwardly off-set portion defining a continuous shoulder corresponding to a predetermined outline and adapted to support a sheet of material with the free marginal edges of the material overlapping the off-set portion, a tubular frame supported in the chamber above the sheet of material and corresponding in outline to the outline aforesaid of the shoulder, said frame communicating with a source of fluid under pressure and having provision for discharging the fluid under pressure on the sheet of material around the marginal edge portion of said sheet at the inner side of the continuous shoulder formed by said off-set portion.

5. In apparatus of the class described, a fluid pressure chamber, a form in said chamber adapted to support a sheet of material and having air vents spaced from each other on a line defining a predetermined outline, said air vents being located to assume a position beneath the marginal edge portion of the sheet of material, and a tubular frame supported in the chamber above the sheet of material and having provision for discharging fluid under pressure at relatively high velocity on the sheet of material around the marginal edge portion of said sheet directly above the air vents.

6. In apparatus of the class described, a fluid pressure chamber, a form in said chamber adapted to support a sheet of material, a manifold in the chamber communicating with a source of fluid supply and having provision for discharging fluid under pressure at a relatively high velocity on the sheet of material adjacent the marginal edge of the latter, and means carried by the manifold engageable with the sheet of material beyond the portion of the material subjected to the direct action of the fluid under pressure.

7. In apparatus of the class described, a fluid pressure chamber, a form in said chamber having an upwardly off-set portion defining a shoulder and adapted to support a sheet of material with the marginal edge of the latter overlapping the off-set portion, means for discharging fluid under pressure into the chamber including a manifold supported above the material and having provision for discharging fluid under pressure on the sheet of material at the inner side of the shoulder, and means carried by the manifold yieldably urged into engagement with the portion of the marginal edge of the material overlapping the off-set portion aforesaid.

8. In apparatus of the class described, a fluid pressure chamber, a form in said chamber adapted to support a sheet of material, a tubular frame positioned within the chamber above the sheet of material and having provision for discharging fluid under pressure on the sheet of material adjacent the marginal edges thereof, a frame coextensive with the tubular frame and supported from the under side of the latter, and yieldable means for urging the frame into intimate contacting relation with the free marginal edge of the sheet beyond the portion of the latter subjected to the direct action of the fluid pressure discharged from the tubular frame.

9. In apparatus of the class described, a fluid pressure chamber, a form in said fluid pressure chamber adapted to support a sheet of material, a tubular frame fluid pressure manifold supported in the chamber above the sheet of material for swinging movement from an operative position in the normal plane of the sheet of material to an inoperative position and having provision for discharging fluid under pressure on the sheet of material adjacent the marginal edge of the latter when in its operative position, and yieldable means maintaining the tubular frame in its operative position and operable to assist swinging movement of the frame to its inoperative position.

10. In apparatus of the class described, a fluid pressure chamber, a form in said chamber adapted to support a sheet of material, a manifold frame located in the chamber above the sheet of material and corresponding to a predetermined outline, said manifold frame communicating with a source of fluid under pressure and having a series of restricted openings in the under side thereof positioned in close proximity to each other on a line corresponding to the outline aforesaid and operable to discharge fluid under pressure directly on the sheet of material to effectively clamp the latter to the adjacent surface of the form.

11. In apparatus of the class described, a fluid pressure chamber, a contoured form in said chamber adapted to support a sheet of material, and means for building up a pressure in the chamber above the material to press the latter against said contoured form including a discharge conduit extending around the marginal edge of the sheet of material above the latter and having provision for discharging fluid pressure into the chamber against the marginal edge portions of said sheet.

BERT STANLEY GLOUGIE.